United States Patent
Larsen et al.

(10) Patent No.: US 11,516,075 B1
(45) Date of Patent: Nov. 29, 2022

(54) MODULAR RECONFIGURABLE EDGE COMPUTING NODE

(71) Applicant: Simmonds Precision Products, Inc., Vergennes, VT (US)

(72) Inventors: David F. Larsen, Orwell, VT (US); Thomas G. Wiegele, Eagan, MN (US); Cal Roeske, Eagan, MN (US); Michael J. Haukom, Farmington, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 27 days.

(21) Appl. No.: 17/308,530

(22) Filed: May 5, 2021

(51) Int. Cl.
*H04L 41/0803* (2022.01)
*H04L 41/0866* (2022.01)

(52) U.S. Cl.
CPC ...... *H04L 41/0803* (2013.01); *H04L 41/0866* (2013.01)

(58) Field of Classification Search
CPC .. H04L 41/0803; H04L 41/0866; G06F 9/445
See application file for complete search history.

(56) References Cited

U.S. PATENT DOCUMENTS

| | | | |
|---|---|---|---|
| 2005/0267998 A1* | 12/2005 | Ferguson | G06F 9/4411 710/8 |
| 2019/0007528 A1* | 1/2019 | Lake | H04L 69/18 |
| 2020/0283126 A1 | 9/2020 | Dong et al. | |

FOREIGN PATENT DOCUMENTS

WO  WO-2020131497 A1  6/2020

* cited by examiner

*Primary Examiner* — Philip C Lee
*Assistant Examiner* — Jihad K Boustany
(74) *Attorney, Agent, or Firm* — Locke Lord LLP; Scott D. Wofsy; Judy R. Naamat

(57) ABSTRACT

A reconfigurable edge computing node of a complex system is provided, the edge computing node including a core module executing selectable core software, and selectable input module(s) and/or output module(s) which can be installed in corresponding input/output ports, wherein each of the input module(s) or output module(s) provides a conduit for moving data to or from the complex system, with selections being chosen from catalogs of available input modules, available output modules, and available core software. The edge computing node provides reconfiguration upon attachment of any input or output module(s), or upon installation of any core software, automatically reconfiguring the edge computing node to enable communication between the core module and the input module(s) and output module(s) using compatible protocols. Reconfiguration of the edge computing node has been previously tested for each allowable combination of available selections of the input and output module(s) to satisfy a certification requirement.

20 Claims, 5 Drawing Sheets

MODULAR RECONFIGURABLE EDGE COMPUTING NODE

FIELD OF THE DISCLOSURE

The present disclosure relates to system data processing needs for diverse components and subsystems of a complex system, and more particularly to a modular reconfigurable edge computing node to enable data processing needs for diverse components and subsystems of a complex system.

BACKGROUND

In a complex system having multiple components and subsystems, there is a need to monitor each of these components and subsystems. As the components and subsystems evolve over time, the local monitoring system for monitoring these evolving components and subsystems will require updates coinciding with evolving performance and functional demands.

Furthermore, testing each of the different local monitoring systems can be time consuming and arduous when the complex system must comply with particular standards, such as those due to regulations enacted by an overseeing governance. For example, every component of an aircraft must comply with strict certification requirements. The certification process can be quite lengthy. Each local monitoring system must undergo a certification process, including each newly updated version, causing repetition of application of the certification process. Each instance of undergoing a certification process for a component or subsystem of the aircraft drives up cost and can cause delays to deployment of sales of the component, subsystem, and/or aircraft.

Conventional methods and systems have generally been considered satisfactory for their intended purposes. However, there is still a need in the art for an improved system and method for monitoring of components or subsystems of a complex system that reduce the need for repeating processes for compliance with regulations. The present disclosure provides a solution for this need.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in accordance with one aspect of the disclosure a modular, reconfigurable edge computing node of a complex system is provided. The complex system is governed by a certification requirement. The edge computing node upon reconfiguration includes one or more input modules, wherein each input module is selected from a catalog of different types of available input modules, wherein each selected input module is configured to provide a physical conduit from a corresponding data source of the complex system to a corresponding input port of a core module of the edge computing node. The edge computing node further comprises one or more output modules, wherein each output module is selected from a catalog of different types of available output modules, wherein each selected output module is configured to provide a physical conduit from a corresponding output port of the core module to a corresponding computing device included in or exterior to the complex system.

The edge computing node further comprises a core module having a central processing unit (CPU), an input port that corresponds to each of the one or more input modules for receiving the corresponding input module and for providing data received by the corresponding input module to the CPU according to a type of the corresponding input module, once selected, and an output port that corresponds to each of the one or more output modules for receiving the corresponding output module and providing data from the CPU to the corresponding output module for output from the edge computing node according to a type of the corresponding output module, once selected. The core module is configurable by selection and configuration of core software from a catalog of different types of available core software for coordination of movement of the data from the input port(s) to the output port(s) and for processing the data received from the input port(s) before moving the data to the output port(s). Reconfiguration of the edge computing node has been previously tested, once reconfigured, for each allowable combination of available selections to satisfy the certification requirement, the available selections including selections from the catalog of available input modules, the catalog of available output modules, and the catalog of available core software.

In one or more embodiments, the core software selected from the catalog of available core software can be provided to the core module for configuring and installing the core software onto the CPU via a communication bus and at least one of the input ports.

In one or more embodiments, the core software selected from the catalog of available core software for configuring the CPU can include an operating system (OS).

In one or more embodiments, the OS can include cybersecurity features.

In one or more embodiments, the core software selected from the catalog of available core software for configuring the CPU can trigger the CPU to automatically reconfigure the edge computing node, wherein automatically reconfiguring the edge computing node can include determining a protocol used by the input data provided by the one or more input modules and/or provided to the one or more output modules and automatically configuring the core module to select a protocol to be used for enabling communication between the core module and the one or more input modules and/or the one or more output modules.

In one or more embodiments, the core software selected from the catalog of available core software for configuring the CPU can trigger the CPU to automatically reconfigure the edge computing node, and automatically reconfiguring the edge computing node can include determining a protocol used by the input data provided by the one or more input modules and/or provided to the one or more output modules and converting the input data provided by the one or more input modules or provided to the one or more output modules to use a protocol that is compatible with the core module for enabling communication between the core module and the one or more input modules and/or the one or more output modules.

In one or more embodiments, the core software selected from the catalog of available core software for configuring the CPU can trigger the CPU to automatically reconfigure the edge computing node, and automatically reconfiguring the edge computing node can include determining a protocol used by the input data provided by the one or more input modules and/or provided to the one or more output modules.

In one or more embodiments, previous testing can include validating, for each allowable combination of available selections, a configuration of each input module, output module, and core module, including embedded software modules of then input and output modules, if any, while in a reconfigured state, detecting any configuration violation that resulted in a failure to validate, reverting the edge computing node to a default "do no harm" state upon detection of a configuration violation, and outputting notification of a configuration violation.

In one or more embodiments, the core software selected from the catalog of available core software for configuring the CPU can trigger the CPU to automatically reconfigure the edge computing node, and automatically reconfiguring the edge computing node can include optimizing performance of the edge computing node based on a determined configuration of the core module, the one or more input modules, and the one or more output modules.

In one or more embodiments, the core software selected from the catalog of available core software for configuring the CPU can trigger the CPU to automatically reconfigure the edge computing node, and automatically reconfiguring the edge computing node can include and can be based on identification of the one or more input ports and/or the one or more output ports.

In one or more embodiments, wherein further automatically reconfiguring the edge computing node can include, only once identified, authenticating and/or authorizing the one or more input modules and/or the one or more output modules.

In one or more embodiments, processing the data received from the one or more input modules can include monitoring health of the one or more input modules and validating the data received by the one or more input modules, and/or moving the data processed by the core module to the one or more output modules includes monitoring health of the one or more output modules.

In accordance with a further aspect of the disclosure, a method of configuring a reconfigured modular, edge computing node of a complex system is provided. The complex system is governed by a certification requirement. The method includes, in a core module of the edge computing node, once having core software selected from a catalog of different types of available core software and installed, detecting one or more input modules installed in a corresponding input port, wherein each of the one or more input modules is selected from a catalog of different types of available input modules and provides a physical conduit for receiving input data from a data source of the complex system and providing the input data for processing.

The core module further detects one or more output modules installed in a corresponding output port, wherein each of the one or more output modules is selected from a catalog of different types of available input modules and provides a physical conduit for providing a result of the processing to be output as output edge data to a computing device included in or exterior to the complex system. The method further includes, in response to detection of installation of the one or more input modules and output modules, automatically reconfiguring the edge computing node for enabling communication between the core module and the one or more input modules and/or the one or more output modules using compatible protocols. Reconfiguration of the edge computing node has been previously tested, once reconfigured, for each allowable combination of available selections to satisfy the certification requirement, the available selections including selections from the catalog of available input modules, the catalog of available output modules, and the catalog of available core software.

In one or more embodiments, the core software selected from the catalog of available core software for configuring the CPU can trigger the CPU to automatically reconfigure the edge computing node, wherein automatically reconfiguring the edge computing node can include determining a protocol used by the input data provided by the one or more input modules and/or provided to the one or more output modules and automatically configuring the core module to select a protocol to be used for enabling communication between the core module and the one or more input modules and/or the one or more output modules.

In one or more embodiments, the core software selected from the catalog of available core software for configuring the CPU can trigger the CPU to automatically reconfigure the edge computing node, wherein automatically reconfiguring the edge computing node can include determining a protocol used by the input data provided by the one or more input modules and/or provided to the one or more output modules and converting the input data provided by the one or more input modules or provided to the one or more output modules to use a protocol that is compatible with the core module for enabling communication between the core module and the one or more input modules and/or the one or more output modules.

In one or more embodiments, the core software selected from the catalog of available core software for configuring the CPU can trigger the CPU to automatically reconfigure the edge computing node, wherein automatically reconfiguring the edge computing node can include determining a protocol used by the input data provided by the one or more input modules and/or provided to the one or more output modules.

In one or more embodiments, the previous testing can include validating, for each allowable combination of available selections, a configuration of each input module, output module, and core module, including embedded software modules of then input and output modules, if any, while in a reconfigured state, detecting any configuration violation that resulted in a failure to validate, reverting the edge computing node to a default "do no harm" state upon detection of a configuration violation, and outputting notification of a configuration violation.

In accordance with a further aspect of the disclosure, a modular, reconfigurable edge computing node of a monitor system is provided that monitors health-related condition of a complex system, wherein the complex system is governed by a certification requirement. The edge computing node upon reconfiguration includes a central processing unit (CPU) configured to receive and analyze health-related data and output results of the analysis of the health-related data and one or more input ports and one or more output ports.

The one or more input ports are configured to receive a corresponding input module and communicate with the CPU, wherein each input module is selected from a catalog of different types of available input modules, wherein each selected input module is configured to provide a physical conduit from a corresponding data source of the monitor system to its corresponding input port, and each input port is configured to communicate health-related data received by its received input module to the CPU according to a type of its received input module.

The one or more output ports are configured to receive a corresponding output module and communicate with the CPU, wherein each output module is selected from a catalog of different types of available output modules, wherein each selected output module is configured to provide a physical conduit from its corresponding output port to a corresponding computing device included in or exterior to the complex system, and each output port is configured to communicate output results that were output by the CPU to its received output module according to a type of its received output module.

The CPU is configurable by selection and configuration of core software from a catalog of different types of available core software for coordination of movement of the health-related data from the one or more input ports to the CPU and the results of the analysis output by the CPU to the one or more output ports and for analyzing the health-related data received from the one or more input ports before moving the results of the analysis to the one or more output ports. Reconfiguration of the edge computing node has been previously tested, once reconfigured, for each allowable combination of available selections to satisfy the certification requirement, the available selections including selections from the catalog of available input modules, the catalog of available output modules, and the catalog of available core software.

In one or more embodiments, the core software selected from the catalog of available core software for configuring the CPU can trigger the CPU to automatically reconfigure the edge computing node. Automatically reconfiguring the edge computing node can includes determining a protocol used by the input data provided by the one or more input modules and/or provided to the one or more output modules. Automatically configuring the edge computing node can further include automatically configuring the core module to select a protocol to be used for enabling communication between the core module and the one or more input modules and/or the one or more output modules or converting the input data provided by the one or more input modules or provided to the one or more output modules to use a protocol that is compatible with the core module for enabling communication between the core module and the one or more input modules and/or the one or more output modules.

The previous testing can include validating, for each allowable combination of available selections, a configuration of each input module, output module, and core module, including embedded software modules of then input and output modules, if any, while in a reconfigured state, detecting any configuration violation that resulted in a failure to validate, reverting the edge computing node to a default "do no harm" state upon detection of a configuration violation, and outputting notification of a configuration violation.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
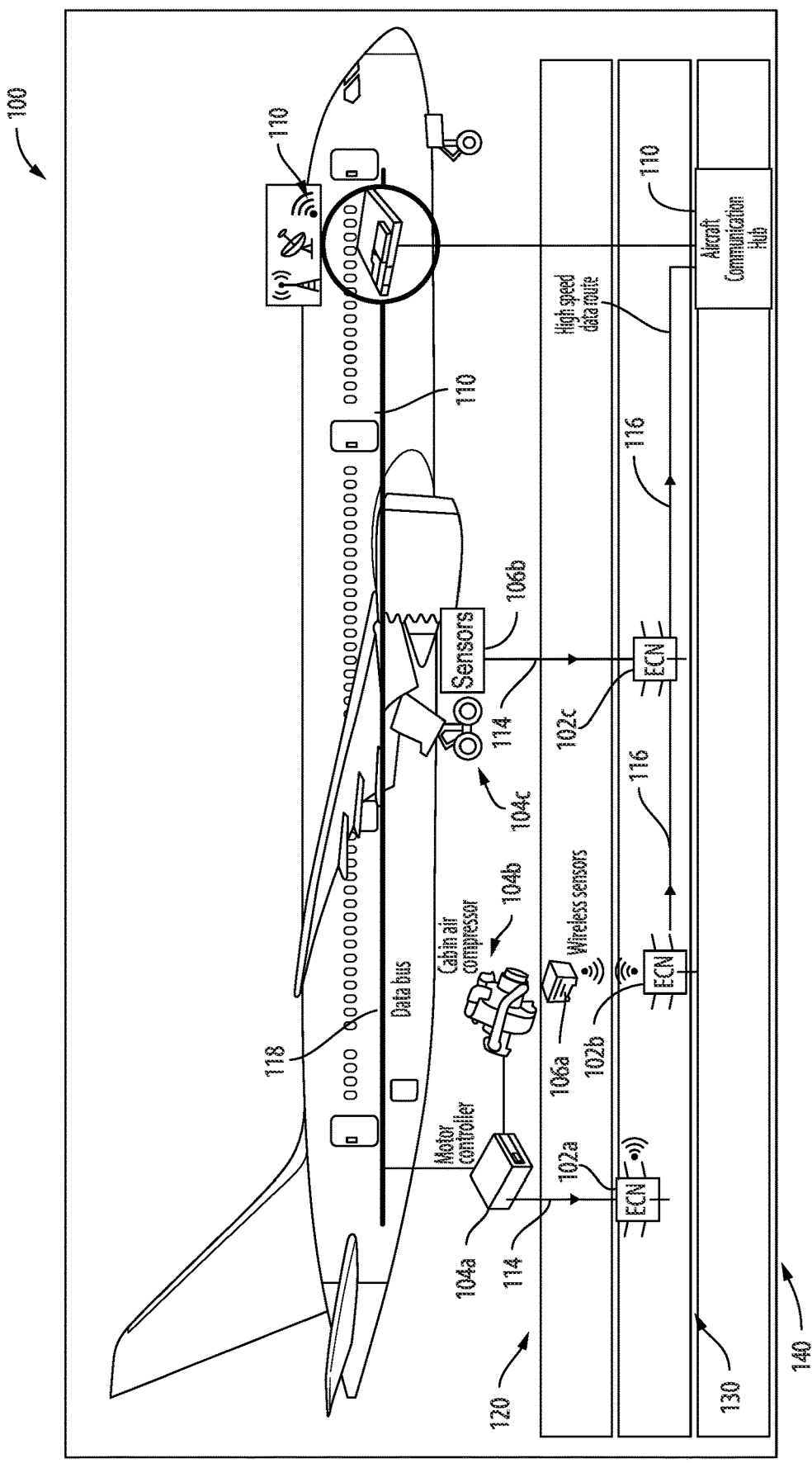
FIG. 1 is an illustrative schematic diagram of an embodiment of a complex system having components with associated reconfigurable edge computing nodes having communication capabilities, in accordance with embodiments of the disclosure.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this present disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "the signal" includes reference to one or more signals and equivalents thereof known to those skilled in the art, and so forth.

It is to be appreciated that one or more of the illustrated embodiments discussed below include a software algorithm, program or code residing on computer useable medium having control logic for enabling execution on a machine having a computer processor. The machine typically includes memory storage configured to provide output from execution of the computer algorithm or program.

Reference will now be made to the drawings, in which like reference numerals identify similar structural features or aspects of the subject disclosure. For purposes of explanation and illustration, and not limitation, an illustrative view of an embodiment of a complex system in accordance with the disclosure is shown in FIG. 1 and is designated generally by reference character 100. Other embodiments and/or aspects of this disclosure are shown in FIGS. 2-5. Referring to FIG. 1, a schematic diagram of an example of complex system 100 is shown, wherein complex system 100 includes a variety of components and/or subs-systems, which are referred to generally as components 104. Components 104 of complex system 100 can be monitored, such as for prognostics, health, maintenance, diagnostics, reliability, efficiency, security, etc. Components 104 can monitor themselves, e.g., for health or status, and output monitored data about themselves or can be monitored by sensors, referenced generally as sensors 108, that output monitor data about the components 104 monitored by the sensors 106. Furthermore, complex system 100 and all of its components 104 and sensors 106 are regulated and required to be tested and certified as satisfying test criteria. The test criteria can be determined by a governing body, such as a regulatory agency, that certifies each component 104 and sensor 106 in complex system 100.

In the example shown, the complex system 100 is an aircraft and the components 104 include a motor controller 104a, a cabin air compressor 104b, and landing gear 104c associated with moving elements, such as motors and actuators. Other examples of components in the context of an aircraft include braking systems, generators, pitot probes, etc. Furthermore, the aircraft can be a military grade or commercial grade aircraft that has heightened certification requirements governed by a government agency. The disclosure is not limited to a particular complex system or components. Other complex systems that are monitored and highly tested at the component level, e.g., for certification by a governing body, are also contemplated.

Edge computing nodes, referenced generally as edge computing nodes (labeled ECN) 102, are provided that acquire monitor data about components 104, such as via communication links 114 or wirelessly during a data acquisition phase 120. Edge computing nodes 102 acquire monitor data from components 104 or sensors 106. In the example shown, component 104a can include an embedded processor that provides monitor data via communication link 114 to edge computing node 102a, wireless sensors 106a monitoring air compressor 104b can include an embedded processor that provides monitor data wirelessly to edge computing node 102b, and sensors 106b monitoring component 106c can each include an embedded processor that provides monitor data via communication link 114 to edge computing node 102c.

Edge computing nodes 102 are configured to acquire the monitor data as received using a specific protocol, perform signal processing and feature extraction on the monitor data and/or localized data analysis, and provide the results as supplemental data wirelessly and/or via a backbone communication link 116 to an aircraft communication hub 110 that has a processor for processing the monitor data and/or transmitting the monitor data out of complex system 100 per whatever protocol is needed.

Communication protocol (also referred to as protocol) refers to a set of formats and rules, such as for governing syntax, semantics, and timing of data communication. A protocol can conform to a standard. Some examples of protocols include wireless access protocols (WAP), IEEE standard 802.11, Bluetooth™, Zigbee™, Ethernet, File Transfer Protocol, Hypertext Transport Protocol (HTTP), Cellular 4G, SATCOM, etc. The term "protocol" as used with respect to data communication, is meant to encompass format, syntax, semantics, standards, etc. Aircraft communication hub 110 can, for example connect to a main data bus 118 or Wi-Fi system of the aircraft for communicating with components 104, have a user interface for exchanging information with pilots, and/or have wireless communication interfaces for communicating with devices that are external to the aircraft, such as control towers, processors at the airport, etc.

Each edge computing node 102 is a modular, reconfigurable device that starts with a base infrastructure that is modified by selecting from a catalog for each module. All possible reconfigurations of the edge computing node are tested, meaning each allowable combination of available selections from the catalog of each module is tested, meaning for achieving any required certification. Accordingly, any reconfiguration of edge computing node 102 is already pre-tested and certified.

The catalogs can be updated as technologies and requirements evolve, such as during evolution of aircraft design, data acquisition and communication technologies, security requirements, and data-driven applications. The catalogs can include selections that would be used by different subsystems of the aircraft. Accordingly, when reconfiguring an edge computing node 102, the engineers can select proven, protocol-compatible modules from a catalog. Since the combination of selections from the catalog used to reconfigure the edge computing node have already been pre-tested and certified, no further testing is necessary. When a required modular edge computing node is not available in any of the catalogs, a new modular edge computing node can be designed, tested and certified independently, and added to the catalog for subsequent use. In this way, an ever-evolving edge computing node provides an established base of functionality and structure for enhancement by new modular components without the need to design, develop, or certify the full set of functionality.

Figure 2:
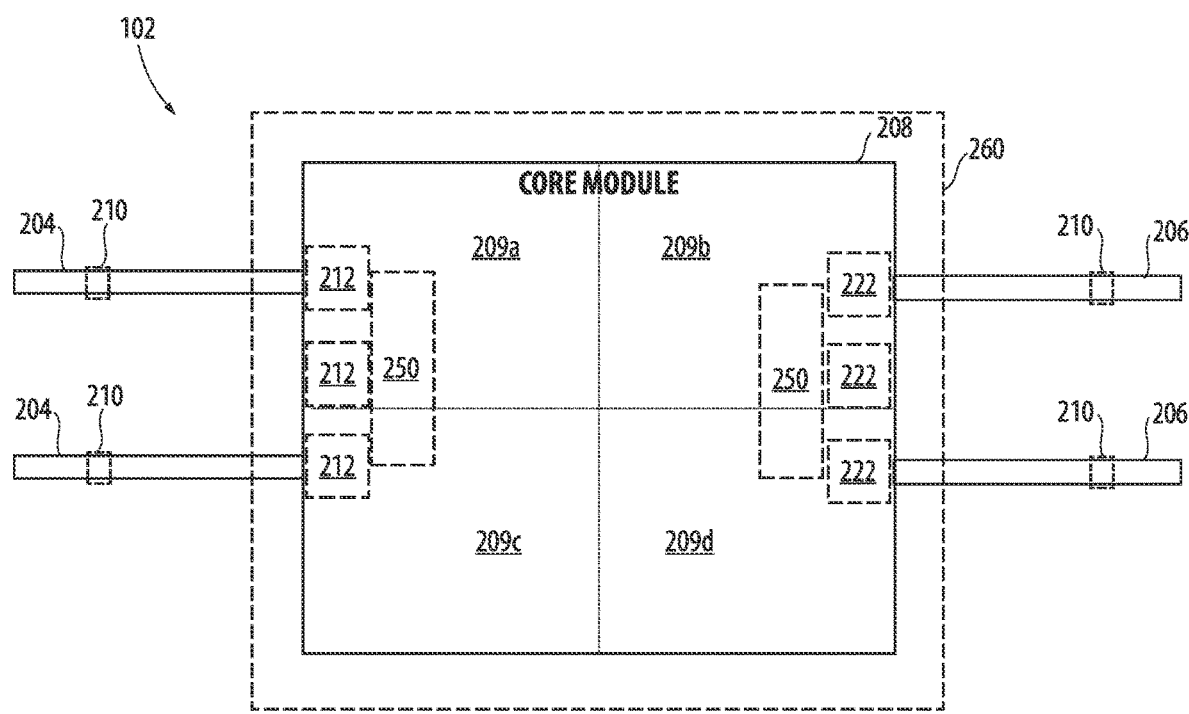
FIG. 2 is an illustrative schematic diagram of an embodiment of a reconfigurable edge computing node system, in accordance with embodiments of the disclosure.

With reference to FIG. 2, a block diagram of an example of an edge computing node 102 as reconfigured is shown in greater detail. Edge computing node 102 is reconfigurable, as it is capable of being reconfigured into another configuration. Edge computing node 102 includes a core module 208, one or more input modules 204, and one or more output modules 206. In one or more embodiments, core module 208 includes a single-core central processing unit (CPU). In one or more embodiments, core module 208 includes a multi-core CPU, without limitation to a specific number of cores. In the example shown, core module 208 includes a CPU having cores 209a, 209b, 209c, and 209d.

Core module 208 includes an input port 212 in which a corresponding input module 204 is installed. Each input port 212 provides a hardware (HW) interface that provides a physical interface between the core module 208 and a corresponding input module 204. Software selected for installation on core module 208 includes a software input interface for interfacing between data received from the input module(s) 204 that were selected and installed in input ports 212 and application software selected and installed on core module 208. The number of input ports 212 can be fixed (meaning not configurable), however every input port 212 does not need to be used. In the example shown, core module 208 has three input ports 212, only two of which are used by an input module 206. Each input port 212 provides the hardware portion of a corresponding input interface.

Core module 208 further includes an output port 222 in which a corresponding output module 206 is installed. Each output port 222 provides a hardware (HW) interface that provides a physical interface between the core module 208 and a corresponding output module 206. The software selected for installation on core module 208 further includes a software output interface for interfacing between the application software selected and installed on core module 208 and data transmitted to the output module(s) 206 that were selected and installed in output ports 222. The number of output ports 222 can be fixed (meaning not configurable), however every output port 222 does not need to be used. In the example shown, core module 208 has three output ports 222, only two of which are used by an output module 206. Each output port 222 provides the hardware portion of a corresponding output interface.

In one or more embodiments, the hardware of core module 208 is not configurable. This means that input ports 212 (including the hardware portion of input interfaces), and output ports 222 (including the hardware portion of output interfaces) are preconfigured.

Core module 208 is configurable by selection and configuration of software from a catalog of core software. The software can control coordination of movement of data received via input port(s) 212 to the output port(s) 222. The software can further be configured to include one or more application software (also referred to as apps) to process the data received via input port(s) 212 before moving the data to the output port(s) 222. The apps can each have a particular purpose for processing the data. The software selected from the catalog of core software can be input for installation on core module 208 via a communication bus of core module 208 and one or more of input ports 212. Core module 208, based on its configuration with the software selected, uses a particular protocol. In order for core module 208 to process or move the data from the input port(s) 212 to the output port(s) 222, the data must be configured using this particular data protocol. Accordingly, the software selected and installed on core module 208 can be configured to perform conversions from a protocol used by the input module(s) to the protocol used by core module 208.

In one or more embodiments, the software can include an operating system (OS). The OS can be, for example, a real time OS (RTOS) or a variant that provides task scheduling and file system support. The catalog of core software can include a selection of different OSs. For example, the OS selections can be application-specific, since one OS selection may work better with applications having a lower level of data access layer usage, whereas a different OS selection may work better with applications having a higher level of data access layer usage. The OS can further facilitate communication with sensors 106, components 104, other edge computing nodes 102, and/or aircraft communication hub 110. The OS can be designed with cybersecurity features (e.g., certificate management, encryption, etc.). Some non-limiting examples of cybersecurity features that could be resident on the edge computing node 102 include Trusted Platform Module (TPM), Enrollment over Secured Transport (EST), Extensible Authentication Protocol Transport Layer Security (EAP-TLS).

In one or more embodiments, the applications executed by core module 208 can process the data received from input module(s) 204 for monitoring health of the input module(s) 204 and validating data received by the input module(s) 204.

In one or more embodiments, the data processed by the core module 208 and moved to the output module(s) 206 via the output interface(s) facilitates health monitoring of the output module(s) 206.

Core module 208 can further include additional elements 250, such as a power source, electro-magnetic interference (EMI) protection, and signal conditioning circuitry for the input ports 212 and/or output ports 222. In addition, core module 208 can further be provided with an enclosure 260 that can be hardened and/or provide additional thermal, EMI, vibration protection, and/or shock protection, such as for use in harsh environments.

Each of input module(s) 204 is selected from a catalog of different types of available input modules. Input module 204 is configured to physically connect with input port 212 for enabling data communication with the software installed on core module 208. Each input module 204 is a hardware device that provides a physical conduit for data from a data source of the complex system 100 to the core module 208 via its corresponding input port 212 in which the input module 204 is installed.

The individual input module(s) 204 can include an embedded processor 210, such as a microprocessor, field-programmable gate array (FPGA), etc. that includes conversion software configured to convert data received by the input module 204 into a protocol that is usable by core module 208, and namely by the applications with which core module 208 is configured for processing data received from the input module 204.

In one or more embodiments, each input module 204 is provided with a pre-selected embedded processor 210 that is configured specifically for the input module 204.

In one or more embodiments, the embedded processor 210 can be selected from a catalog of different available input embedded processors in order to achieve a desired configuration of input module 204.

Each of output module(s) 206 is selected from a catalog of different types of available output modules. Output module 206 is configured to physically connect with output port 222 for enabling data communication with the software installed on core module 208. Each output module 206 is a hardware device that provides a physical conduit for data from core module 208 to a computing device included in or exterior to the complex system 100 via the output port 222 in which the output module 206 is installed.

The individual output module(s) 206 can include an embedded processor 210, such as a microprocessor, FPGA, etc. that includes conversion software configured to convert data received by the output module 206 from core module 208, and namely by the applications with which core module 208 is configured for processing data sent to the output module 206. The embedded processor 210 can convert data received from core module 208 into a format that is compatible with the computing device to which it is coupled.

In one or more embodiments, each output module 206 is provided with a pre-selected embedded processor 210 that is configured specifically for the output module 206. In one or more embodiments, the embedded processor 210 can be selected from a catalog of different available input embedded processors in order to achieve a desired configuration of output module 206.

Testing the combination of selections from the catalogs available to use to reconfigure the edge computing node 102, e.g., for certification by a regulatory board, can further include testing each allowable combination, including each allowable combination with a selection from the catalog of available input embedded processors and/or the catalog of available output embedded processors.

The testing of each allowable combination of available selections from the available catalogs (e.g., the catalog of available input modules, the catalog of available output modules, the catalog of available core software, and the catalog of embedded software modules for the input and output modules) includes validating each allowable combination of available selections, detecting any configuration violation that resulted in a failure to validate, reverting edge computing node 102 to a default "do no harm" state upon detection of a configuration violation, and outputting notification of a configuration violation.

Validating each allowable combination of available selections includes, for each allowable combination, individually validating the configuration of each input module 204 (which includes its embedded software module 210, if any), each output module 206 (which includes its embedded software module 210, if any), and the core module 208, as well as validating the configuration of the overall edge computing node 102 while in its reconfigured state (with input and output modules 204 and 206, respectively, installed, including before and after the core module performs any automatic reconfiguration). Validation includes matching a configuration of each installed module (meaning each input module 204 and output module 206) upon identifying itself to the core module 208 based on an expectation of the core module 208, and establishing a brief communication exchange with the installed module. For example, an input module 204 might have a programmable data file with configuration parameters. The core module 208 matches receives these configuration parameters upon installation of the input module 204 and matches these configuration parameters to an entry in a corresponding data table stored in the core module 208. Core module 208 further establishes the brief communication exchange with the input module 204. Failure to establish this communication or to find an entry in its data table that matches the configuration parameters causes the validation to fail.

The edge computing node 102 reverts to the default "do no harm" state when validation fails by not accepting a connection of an input module 204 or output module 206 that could not be validated. In effect, the core module 208 maintains prior operation (such as with other previously validated input modules 204 and/or output modules 206) and treats the input module 204 or output nodule 206 that failed validation to be in an "off" or "inert" state. This ensures that continued operations will only reflect validated configurations.

Notification of a configuration violation is performed by outputting a flag via one of the previously validated output modules 206. For example, a discrete value (e.g., a binary value of 0 or 1) may be triggered, or a data tag on a communication bus may be set to a "validated" or "failed" status.

Once edge computing node 102 is reconfigured by installing the selected software of core module 208 and by installing each of the selected input module(s) 204 and output module(s) 206 in the corresponding input port(s) 212 and output port(s) 222, respectively, the selected software installed and executed by core module 208 can detect installation of input module(s) 204 and output module(s) 206. Edge computing node 102 can be dynamically configured once installation of the input module(s) 204 and/or output module(s) 206 is detected. Methods for dynamically configuring edge computing node 102 can include a range of methods from simple pin programming to more sophisticated internet protocol (IP) certificate-based configurations by core module 208 of input or output modules 204 and 206, respectively, using configuration data. The configuration data can be in the form of parameter data item files (PDIFs). Range and Compatibility of settings of the configuration data can be verified at design time This detection can trigger core module 208 to perform automatic reconfiguration of the edge computing node 102 to correspond to the input module(s) 204 and output module(s) 206 that have been attached to the core module 208.

In one or more embodiments, automatic reconfiguration can include the core module 108, as configured with the selected software, determining a choice of protocols from the limited prescribed set used by the input data provided by the one or more input modules and/or provided to the one or more output modules. The determination of protocols can be performed, for example, using a handshaking between core module 208 (using the selected software) and the input module(s) 204 and/or output module(s) 206 as selected and installed.

Based on this determination of protocol(s) used, the core module 208 can be configured to automatically configure itself, e.g., its software input interface, to use a protocol that is compatible with the determined protocol for enabling communication between core module 208 and the input module(s) 204 and/or the output module(s) 206. This encompasses core module 208 configuring itself to use different protocols for communicating with input module(s) 204 versus output module(s) 206.

In one or more embodiments, based on this determination of protocol(s) used, the core module 208 can be configured to automatically convert input data received from input module(s) 204 or convert the data to be output to output module(s) 206 to use a protocol that is compatible with a protocol used by core module 208 for enabling communication between core module 208 and the input modules 204 and/or the output module(s) 206.

In one or more embodiments, based on this determination of protocol(s) used, core module 208 can configure a processing device of the input modules (204) or of the output modules (206) to select a protocol to be used for enabling communication between core module 208 and the input modules 204 and/or the output module(s) 206. In one or more embodiments, based on this determination of protocol(s) used, core module 208 can configure a processing device of the input modules (204) or of the output modules (206) to convert the input data provided by the one or more input modules or provided to the one or more output modules to use a protocol that is compatible with the core module for enabling communication between the core module and the one or more input modules and/or the one or more output modules. In one or more embodiments, automatic reconfiguration of edge computing node 102 can include optimizing performance of edge computing node 102 based on the configuration of core module 208 (meaning the software selected and installed on core module 208), the configuration of the input module(s) 204 (meaning the input module(s) 204 that were selected and installed), and the configuration of the output module(s) 206 (meaning the output module(s) 206 that were selected and installed). This performance optimization can, for example, include selection of particular software protocols used by core module 208 and the embedded processors 210 of the input modules 204 and the output modules 206, if so equipped, to exchange data between the core module 208 and input and output modules 204 and 206, respectively; and/or utilization of specific processing cores 209, if so equipped, for particular functions.

In one or more embodiments, automatic reconfiguration of edge computing node 102 can include identifying the one or more input module(s) 204, the input embedded processors 210 (if any), the one or more output module(s) 206, and/or the output embedded processors 210 (if any). Furthermore, automatic reconfiguration of edge computing node 102 can include configuring the input embedded processor 210 and/or the output embedded processor 210 based on the identification. In one or more embodiments, core module 208 can configure its own installed software to accommodate the protocol used by the input module(s) 204 and/or output module(s) 206 based on their identification.

In one or more embodiments, automatic reconfiguration of edge computing node 102 can include, only once identified, using methods for dynamic authenticating and/or authorizing input module(s) 204 and/or the output module(s) including their embedded processors 210 (if any). The methods for dynamic authentication and/or authorization can range from simple pin programming to more sophisticated internet protocol (IP) certificate-based authentication and/or authorization for continued communication between core module 208 and input or output modules 204 and 206 respectively. Authentication and authorization ensure that fraudulent or valid but as-yet-incomplete input modules 204, output modules 206, and core module 208 cannot interfere with the proper operation of the edge configuration node 102.

Figure 3:
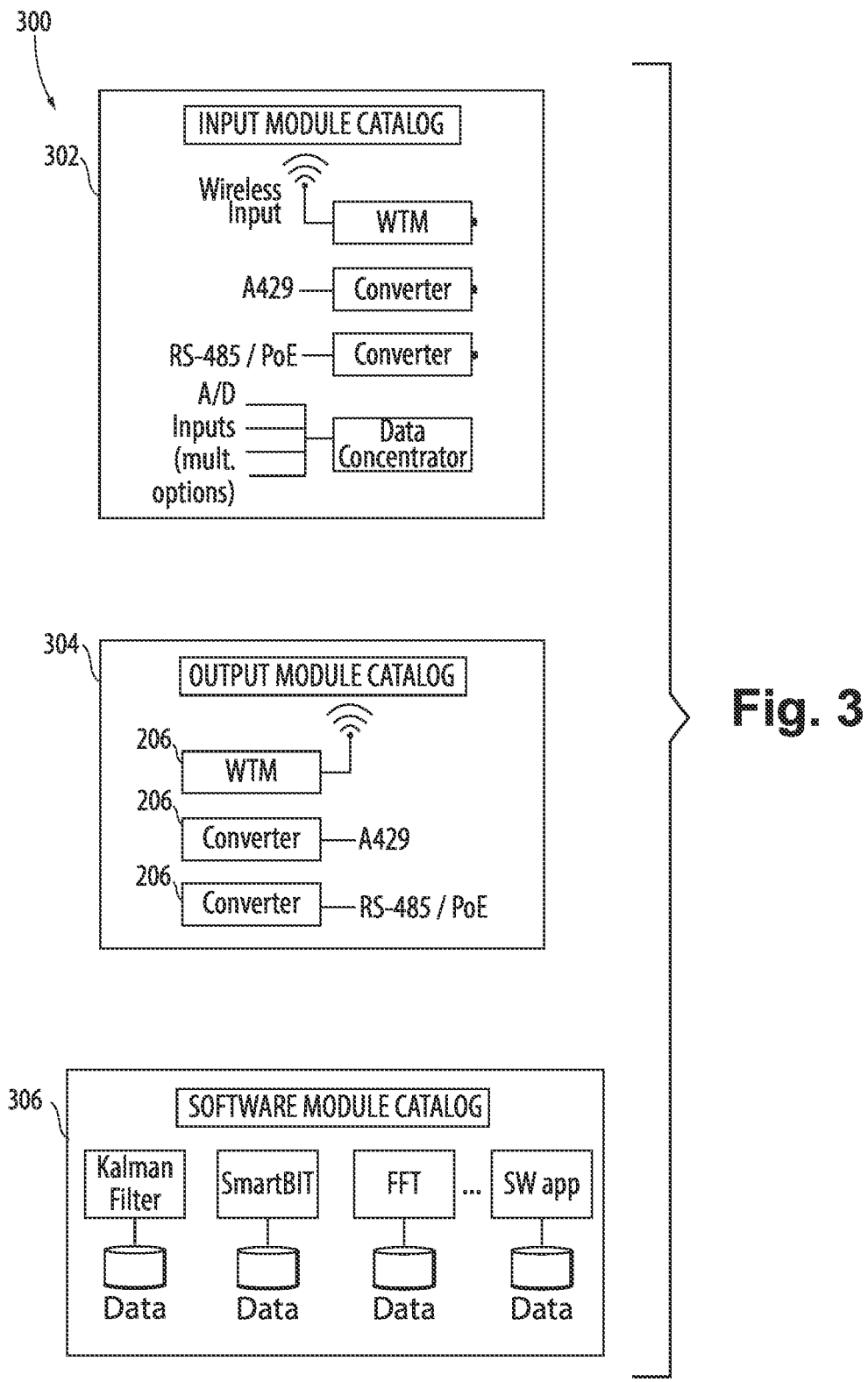
FIG. 3 is a screenshot of catalogs of input modules, output modules, and software for installation on a core module of a reconfigurable edge computing node, in accordance with embodiments of the disclosure.

With reference to FIG. 3, a diagram is shown of catalogs 300, including an input module catalog 302 for selecting input module(s) 204, an output module catalog 304 for selecting output module(s) 206, and a software module catalog 306 for selecting software for installation on core module 208, such as applications and/or an operating system.

The input module catalog 302 is shown with sample entries of types of connectors that can provide a physical conduit between a data source and the input interface of core module 208, providing the data in a digital format that the input interface 212 can receive and use. Some example entries shown in input module catalog 302, without limitation to the examples shown, include a physical conduit that provides analog to digital conversion (ADC), or can receive data via physical conductors using standards such as RS-485, ARINC429, or Ethernet, or can receive data wirelessly using a protocol such as 802.11 Wi-Fi.

The output module catalog 304 is shown with sample entries of types of connectors that can provide a physical conduit between the output interface 222 of core module 208 and a computing device within or external to complex system 100, receiving the data from the output interface in a digital format and providing it to the computing device in a receivable protocol. Some example entries shown in output module catalog 304, without limitation to the examples shown, include a physical conduit that provides digital to analog conversion (DAC), or can transmit data via physical conductors using standards such as RS-485, ARINC429, or Ethernet, or can receive data wirelessly using a protocol such as 802.11 Wi-Fi.

The software module catalog 306 is shown with sample entries of software operating systems or applications that can be selected for installation on core module 208, wherein the operating system entries are configured to coordinate handling of data received at the input interface 212 until it is transmitted from the output interface and processing of the data and the applications are for processing the data before it is transmitted through the output interface 222. Some example entries shown in software module catalog 306, without limitation to the examples shown, include one or more proprietary or commercially available operating systems that can be appropriate for particular operations, and one or more applications, such as a Kalman filter or a Fourier analysis software; data validation software; data fusion functionality; and data reduction, compression, encryption; and/or other cybersecurity functions.

Figure 4:
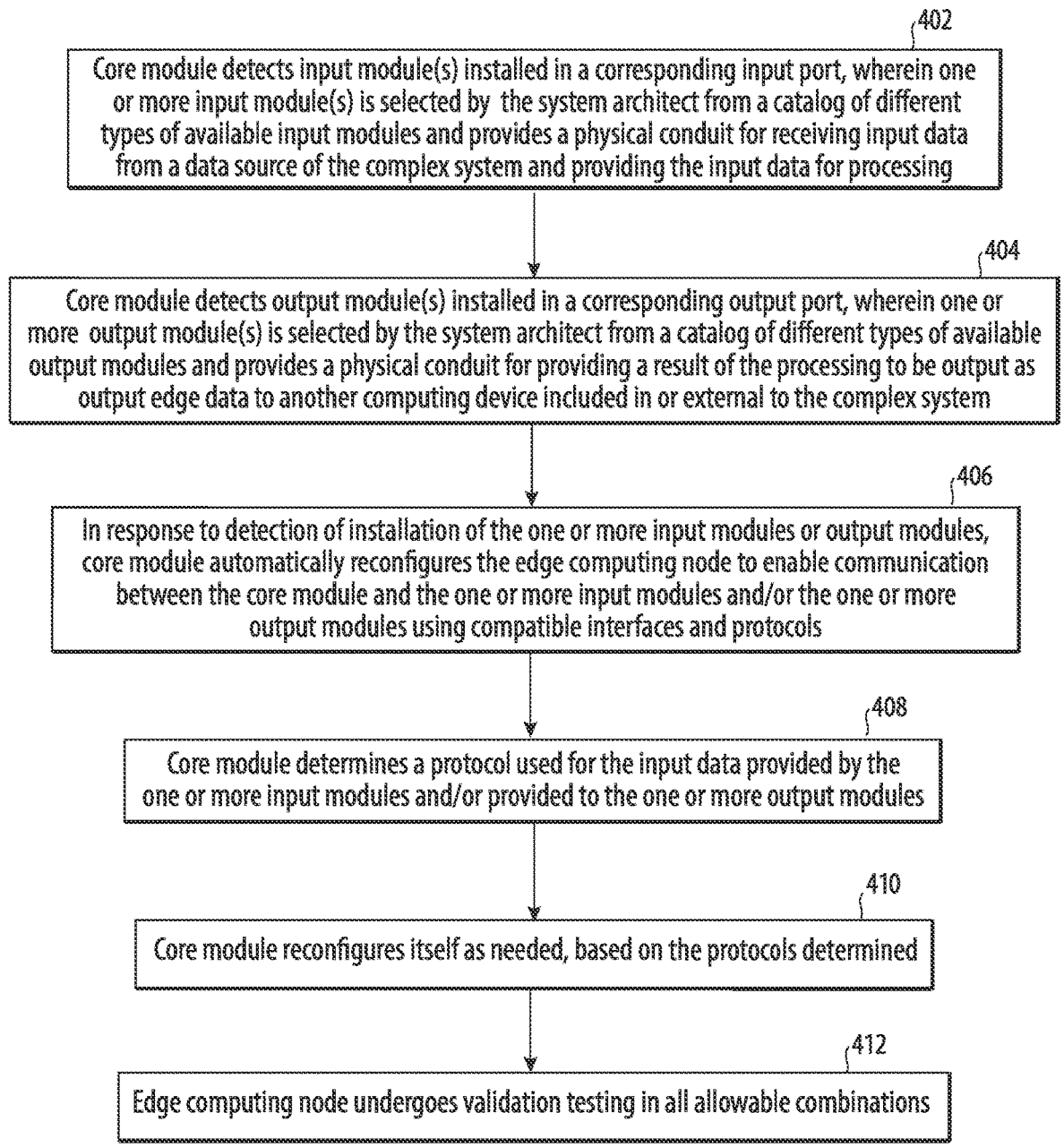
FIG. 4 is a flowchart of an example method of auto-configuration of a reconfigurable computing node, in accordance with embodiments of the disclosure.

With reference now to FIG. 4, shown is a flowchart demonstrating implementation of various exemplary embodiments of the disclosure. It is noted that the order of blocks shown in FIG. 4 is not required, so in principle, the various blocks may be performed out of the illustrated order or in parallel. Also certain blocks may be skipped, different blocks may be added or substituted, or selected blocks or groups of operations may be performed in a separate application following the embodiments described herein.

With reference to FIG. 4, a flowchart 400 is shown that illustrates an example method of auto-configuring a reconfigured modular, edge computing node of a complex system, wherein the complex system may or may not be governed by a certification requirement. At block 402, input module(s) installed in a corresponding input port are detected, e.g., in order of installation. Each of the input module(s) is selected from a catalog of different types of available input modules and provides a physical conduit for receiving input data from a data source of the complex system and providing the input data for processing. At block 404, output module(s) installed in a corresponding output port are detected, e.g., in order of installation. Each of the output module(s) is selected from a catalog of different types of available output modules and provides a physical conduit for providing a result of the processing to be output as output edge data to a computing device included in or exterior to the complex system. At block 406, in response to detection of installation of input module(s) 204 and/or output module(s) 206, the edge computing node 102 is automatically reconfigured for enabling communication between the core module and the one or more input modules and/or the one or more output modules using compatible protocols. At block 408, regarding automatic reconfiguration, a protocol used by the input data provided by the input module(s) 204 and/or the result of the processing provided to the output module(s) 206 is determined. At block 410, the core module reconfigures itself as needed based on the protocols determined, such as by configuring the protocols used by the core module or any conversions performed by the core module.

At block 412, the edge computing node undergoes validation testing for all of its allowable combinations, including detecting configuration violation that resulted in a failure to validate, reverting to a "do not harm" state upon detection of a configuration violation, and outputting notification of a configuration violation. Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
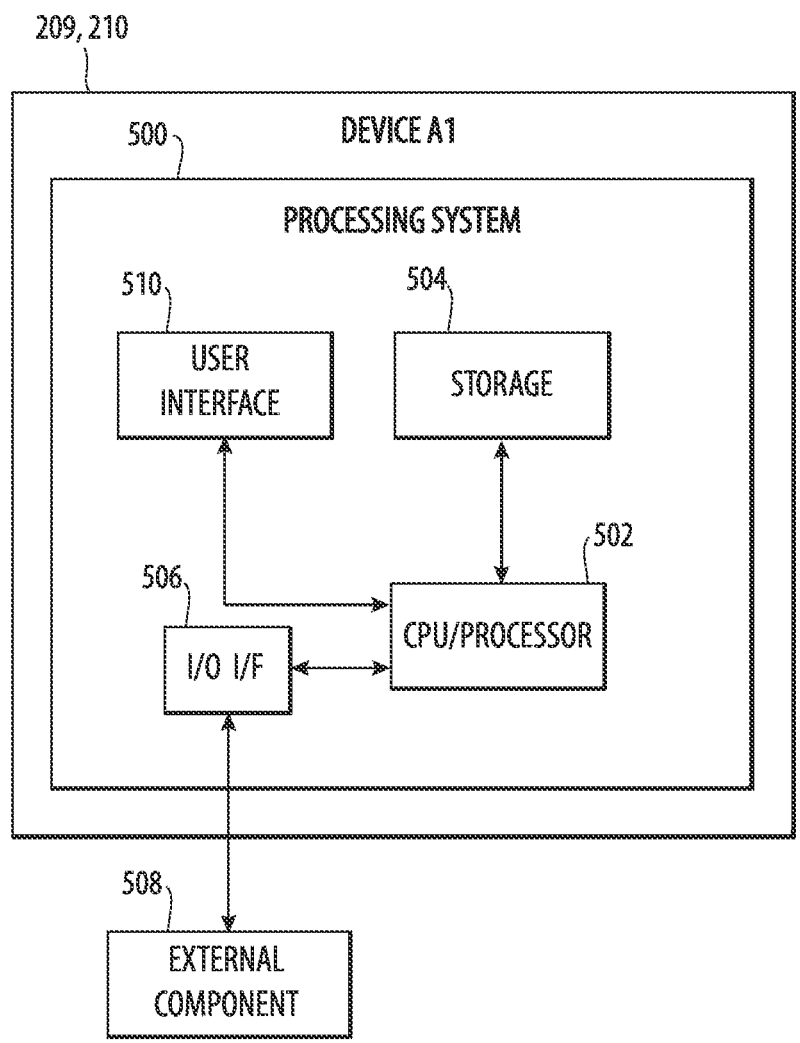
FIG. 5 is a block diagram of an exemplary computer system that implements any of input modules, output modules, and a core module of a reconfigurable edge computing node, in accordance with embodiments of the disclosure.

With reference to FIG. 5, a block diagram of an example computing system 500 is shown, which provides an example for configuration of core module 208 or its cores 209, and embedded processor 210, which are shown as Device A1. Additionally, all or portions of core module 208 or its cores 209, and embedded processor 210, could be configured as software, and computing system 500 could represent such portions. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure.

Computing system 500 is shown in the form of a general-purpose computing device. Computing system 500 includes a processing device 502, memory 504, an input/output (I/O) interface (I/F) 506 that can communicate with an internal component, such as optionally a user interface 510 and optionally an external component 508.

The processing device 502 can include, for example, a Programmable Logic Device (PLD), a microprocessor, a DSP, a microcontroller, an FPGA, an application specific integrated circuit (ASIC), and/or other discrete or integrated logic circuitry having similar processing capabilities.

The processing device 502 and the memory 504 can be included in components provided in the FPGA, ASIC, microcontroller, or microprocessor, for example. Memory 504 can include, for example, volatile and nonvolatile memory for storing data temporarily or long term, and for storing programmable instructions executable by the processing device 502. Memory 504 can be a removable (e.g., portable) memory for storage of program instructions. I/O I/F 506 can include an interface and/or conductors to couple to the one or more internal components 510 and/or external components 508.

Embodiments of the core module 208 or its cores 209, and embedded processor 210, may be implemented or executed by one or more computer systems, such as a microprocessor. Each computer system 500 can be included within core module 208 or its cores 209, embedded processor 210, or multiple instances thereof. In the example shown, computer system 500 is embedded in input module 204, output module 206, or core module 208. In various embodiments, computer system 500 may include one or more of a microprocessor, an FPGA, ASIC, microcontroller. The computer system 500 can be provided as an embedded device. Portions of the computer system 500 can be provided externally, such by way of a centralized computer, a data concentrator, a cockpit computing device controls display, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block diagram may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A modular, reconfigurable edge computing node of a complex system, wherein the complex system is governed by a certification requirement, the edge computing node upon reconfiguration comprising:

one or more input modules, wherein each input module is selected from a catalog of different types of available input modules, wherein each selected input module is configured to provide a physical conduit from a corresponding data source of the complex system to a corresponding input port of a core module of the edge computing node;

one or more output modules, wherein each output module is selected from a catalog of different types of available output modules, wherein each selected output module is configured to provide a physical conduit from a corresponding output port of the core module to a corresponding computing device included in or exterior to the complex system; and a core module having:
 a central processing unit (CPU);
 an input port that corresponds to each of the one or more input modules for receiving the corresponding input module and for providing data received by the corresponding input module to the CPU according to a type of the corresponding input module, once selected; and an output port that corresponds to each of the one or more output modules for receiving the corresponding output module and providing data from the CPU to the corresponding output module for output from the edge computing node according to a type of the corresponding output module, once selected, wherein, the core module is configurable by selection and configuration of core software from a catalog of different types of available core software for coordination of movement of the data from the input port(s) to the output port(s) and for processing the data received from the input port(s) before moving the data to the output port(s), and wherein reconfiguration of the edge computing node has been previously tested, once reconfigured, for each allowable combination of available selections to satisfy the certification requirement, the available selections including selections from the catalog of available input modules, the catalog of available output modules, and the catalog of available core software.

2. The edge computing node of claim 1, wherein the core software selected from the catalog of available core software is provided to the core module for configuring and installing the core software onto the CPU via a communication bus and at least one of the input ports.

3. The edge computing node of claim 1, wherein the core software selected from the catalog of available core software for configuring the CPU includes an operating system (OS).

4. The edge computing node of claim 3, wherein the OS includes cybersecurity features.

5. The edge computing node of claim 1,
wherein the core software selected from the catalog of available core software for configuring the CPU triggers the CPU to automatically reconfigure the edge computing node, and
wherein automatically reconfiguring the edge computing node includes:
determining a protocol used by the input data provided by the one or more input modules and/or provided to the one or more output modules; and
automatically configuring the core module to select a protocol to be used for enabling communication between the core module and the one or more input modules and/or the one or more output modules.

6. The edge computing node of claim 1,
wherein the core software selected from the catalog of available core software for configuring the CPU triggers the CPU to automatically reconfigure the edge computing node, and
wherein automatically reconfiguring the edge computing node includes: determining a protocol used by the input data provided by the one or more input modules and/or provided to the one or more output modules; and
converting the input data provided by the one or more input modules or provided to the one or more output modules to use a protocol that is compatible with the core module for enabling communication between the core module and the one or more input modules and/or the one or more output modules.

7. The edge computing node of claim 1,
wherein the core software selected from the catalog of available core software for configuring the CPU triggers the CPU to automatically reconfigure the edge computing node, and
wherein automatically reconfiguring the edge computing node includes determining a protocol used by the input data provided by the one or more input modules and/or provided to the one or more output modules.

8. The edge computing node of claim 1, wherein the previous testing comprises:
validating, for each allowable combination of available selections, a configuration of each input module, output module, and core module, including embedded software modules of the input and output modules, if any, while in a reconfigured state;
detecting any configuration violation that resulted in a failure to validate;
reverting the edge computing node to a default do no harm state upon detection of a configuration violation; and
outputting notification of a configuration violation.

9. The edge computing node of claim 1,
wherein the core software selected from the catalog of available core software for configuring the CPU triggers the CPU to automatically reconfigure the edge computing node, and
wherein automatically reconfiguring the edge computing node includes optimizing performance of the edge computing node based on a determined configuration of the core module, the one or more input module(s), and the one or more output module(s).

10. The edge computing node of claim 1,
wherein the core software selected from the catalog of available core software for configuring the CPU triggers the CPU to automatically reconfigure the edge computing node, and
wherein automatically reconfiguring the edge computing node includes and is based on identification of the one or more input ports and/or the one or more output ports.

11. The edge computing node of claim 10, wherein further automatically reconfiguring the edge computing node includes, only once identified, authenticating and/or authorizing the one or more input modules and/or the one or more output modules.

12. The edge computing node of claim 1, wherein processing the data received from the one or more input modules includes monitoring health of the one or more input modules and validating the data received by the one or more input modules, and/or moving the data processed by the core module to the one or more output modules includes monitoring health of the one or more output modules.

13. A method of configuring a reconfigured modular, edge computing node of a complex system, wherein the complex system is governed by a certification requirement, the method comprising:
in a core module of the edge computing node, once having core software selected from a catalog of different types of available core software and installed,
detecting one or more input modules installed in a corresponding input port, wherein each of the one or more input modules is selected from a catalog of different types of available input modules and provides a physical conduit for receiving input data from a data source of the complex system and providing the input data for processing;
detecting one or more output modules installed in a corresponding output port, wherein each of the one or more output modules is selected from a catalog of different types of available input modules and provides a physical conduit for providing a result of the processing to be output as output edge data to a computing device included in or exterior to the complex system;

in response to detection of installation of the one or more input modules and output modules, automatically reconfiguring the edge computing node for enabling communication between the core module and the one or more input modules and/or the one or more output modules using compatible protocols, wherein reconfiguration of the edge computing node has been previously tested, once reconfigured, for each allowable combination of available selections to satisfy the certification requirement, the available selections including selections from the catalog of available input modules, the catalog of available output modules, and the catalog of available core software.

14. The method of claim 13,
wherein the core software selected from the catalog of available core software for configuring the CPU triggers the CPU to automatically reconfigure the edge computing node, and wherein automatically reconfiguring the edge computing node includes:
determining a protocol used by the input data provided by the one or more input modules and/or provided to the one or more output modules; and
automatically configuring the core module to select a protocol to be used for enabling communication between the core module and the one or more input modules and/or the one or more output modules.

15. The method of claim 13,
wherein the core software selected from the catalog of available core software for configuring the CPU triggers the CPU to automatically reconfigure the edge computing node, and
wherein automatically reconfiguring the edge computing node includes:
determining a protocol used by the input data provided by the one or more input modules and/or provided to the one or more output modules; and
converting the input data provided by the one or more input modules or provided to the one or more output modules to use a protocol that is compatible with the core module for enabling communication between the core module and the one or more input modules and/or the one or more output modules.

16. The method of claim 13,
wherein the core software selected from the catalog of available core software for configuring the CPU triggers the CPU to automatically reconfigure the edge computing node, and
wherein automatically reconfiguring the edge computing node includes determining a protocol used by the input data provided by the one or more input modules and/or provided to the one or more output modules.

17. The method of claim 13, wherein the previous testing comprises:
validating, for each allowable combination of available selections, a configuration of each input module, output module, and core module, including embedded software modules of the input and output modules, if any, while in a reconfigured state;
detecting any configuration violation that resulted in a failure to validate;

reverting the edge computing node to a default do no harm state upon detection of a configuration violation; and
outputting notification of a configuration violation.

18. A modular, reconfigurable edge computing node of a monitor system that monitors health-related condition of a complex system, wherein the complex system is governed by a certification requirement, the edge computing node upon reconfiguration comprising:
a central processing unit (CPU) configured to receive and analyze health-related data and output results of the analysis of the health-related data;
one or more input ports, each input port configured to receive a corresponding input module of one or more input modules and communicate with the CPU, wherein for each input port, the corresponding input module is selected from a catalog of different types of available input modules, wherein the corresponding input module is configured to provide a physical conduit from a corresponding data source of the monitor system to the input port, and the input port is configured to communicate health-related data received by the corresponding input module to the CPU according to a type of the corresponding input module; and
one or more output ports, each input port configured to receive a corresponding output module of one or more output modules and communicate with the CPU, wherein for each output port, the corresponding output module is selected from a catalog of different types of available output modules, wherein the corresponding output module is configured to provide a physical conduit from the output port to a corresponding computing device included in or exterior to the complex system, and the output port is configured to communicate output results that were output by the CPU to the corresponding output module according to a type of the corresponding output module,
wherein, the CPU is configurable by selection and configuration of core software from a catalog of different types of available core software for coordination of movement of the health-related data from the one or more input ports to the CPU and the results of the analysis output by the CPU to the one or more output ports and for analyzing the health-related data received from the one or more input ports before moving the results of the analysis to the one or more output ports,
wherein reconfiguration of the edge computing node has been previously tested, once reconfigured, for each allowable combination of available selections to satisfy the certification requirement, the available selections including selections from the catalog of available input modules, the catalog of available output modules, and the catalog of available core software.

19. The edge computing node of claim 18,
wherein the core software selected from the catalog of available core software for configuring the CPU triggers the CPU to automatically reconfigure the edge computing node, and
wherein automatically reconfiguring the edge computing node includes:
determining a protocol used by the input data provided by the one or more input modules and/or provided to the one or more output modules; and
automatically configuring the core module to select a protocol to be used for enabling communication between the core module and the one or more input modules and/or the one or more output modules; or converting the input data provided by the one or more input modules or provided to the one or more output modules to use a protocol that is compatible with the core module for enabling communication between the core module and the one or more input modules and/or the one or more output modules.

20. The edge computing node of claim 18, wherein the previous testing comprises:
validating, for each allowable combination of available selections, a configuration of each input module, output module, and core module, including embedded software modules of the input and output modules, if any, while in a reconfigured state;
detecting any configuration violation that resulted in a failure to validate;
reverting the edge computing node to a default do no harm state upon detection of a configuration violation; and
outputting notification of a configuration violation.

* * * * *